(12) United States Patent (10) Patent No.: US 11,707,904 B2
Goodrich (45) Date of Patent: Jul. 25, 2023

(54) EXPANDABLE SLIT SHEET PACKAGING MATERIAL THAT INTERLOCKS WHEN LAYERED AND EXPANDED

(71) Applicant: David Paul Goodrich, Sedona, AZ (US)

(72) Inventor: David Paul Goodrich, Sedona, AZ (US)

( * ) Notice: Subject to any disclaimer, the term of this patent is extended or adjusted under 35 U.S.C. 154(b) by 125 days.

(21) Appl. No.: 16/274,028

(22) Filed: Feb. 12, 2019

(65) Prior Publication Data

US 2020/0247079 A1 Aug. 6, 2020

Related U.S. Application Data

(62) Division of application No. 14/480,319, filed on Sep. 8, 2014, now Pat. No. 10,226,907.

(51) Int. Cl.
*B31D 5/00* (2017.01)
*B32B 3/26* (2006.01)
(Continued)

(52) U.S. Cl.
CPC ........... *B31D 5/0013* (2013.01); *B31D 3/007* (2013.01); *B31D 3/04* (2013.01); *B31D 5/0065* (2013.01);
(Continued)

(58) Field of Classification Search
CPC .. B31D 5/0013; B31D 5/0039; B31D 5/0065; B31D 3/007; B31D 3/04; B31D 1/0031;
(Continued)

(56) References Cited

U.S. PATENT DOCUMENTS

| | | |
|---|---|---|
| 782,977 A | 2/1905 | Madden |
| 1,650,424 A | 11/1927 | Burgess |

(Continued)

FOREIGN PATENT DOCUMENTS

| | | |
|---|---|---|
| EP | 0 768 948 A1 | 4/1997 |
| EP | 1215036 A1 | 6/2002 |

OTHER PUBLICATIONS

Search Report dated Apr. 24, 2020, issued in counterpart EP Application No. 20 15 6524 (5 pages).

(Continued)

*Primary Examiner* — Robert F Long
*Assistant Examiner* — Eduardo R Ferrero
(74) *Attorney, Agent, or Firm* — Studebaker Brackett, PC

(57) ABSTRACT

In accordance with a broad embodiment of the invention, a novel paper product is comprised of two or more slit sheet packing material layers, each layer having its own slit pattern design to create interlocking layers of expansion sheet packaging materials. Each layer expands to create a three dimensional open netting of cells of hexagons, and the like, and is designed to have limited nesting with its opposing layer, thereby maximizing the thickness of the combined layers as compared to nested layers. Adjacent layers have differing slit patterns and can be expanded through expander type machinery such that the expansion rates of the differing slit pattern layers can be varied to deliver the same width of exiting expanded material from each layer. Preferably the differing slit pattern produce when expanded, inclined land areas that have the same number of rows per inch, but different angles of inclination of the land areas, such that adjacent layers can interlock, that is, have a restricted amount of nesting.

10 Claims, 9 Drawing Sheets

(51) Int. Cl.

| | |
|---|---|
| *B32B 3/12* | (2006.01) |
| *B32B 29/00* | (2006.01) |
| *B31D 3/00* | (2017.01) |
| *B31D 3/04* | (2006.01) |
| B65D 81/03 | (2006.01) |
| B65D 65/02 | (2006.01) |
| B31D 1/00 | (2017.01) |
| B65D 85/30 | (2006.01) |
| B65D 81/02 | (2006.01) |

(52) U.S. Cl.
CPC ............... *B32B 3/12* (2013.01); *B32B 3/266* (2013.01); *B32B 29/005* (2013.01); *B31D 1/0031* (2013.01); *B31D 5/0039* (2013.01); *B31D 2205/0023* (2013.01); *B31D 2205/0052* (2013.01); *B31D 2205/0064* (2013.01); *B32B 2250/02* (2013.01); *B32B 2553/00* (2013.01); *B65D 65/02* (2013.01); *B65D 65/44* (2013.01); *B65D 81/03* (2013.01); *B65D 85/30* (2013.01)

(58) Field of Classification Search
CPC .... B31D 2205/0023; B31D 2205/0052; B31D 2205/0064; B32B 3/266; B32B 3/12; B32B 29/005; B32B 2250/02; B32B 2553/00; B65D 81/03; B65D 65/02; B65D 85/30; B65D 65/44; B26D 7/20; B26D 3/12
USPC .................................. 428/136; 53/207, 208
See application file for complete search history.

(56) References Cited

U.S. PATENT DOCUMENTS

| | | | |
|---|---|---|---|
| 1,912,681 A | 6/1933 | Paker | |
| 3,065,785 A | 11/1962 | Taber | |
| 3,554,068 A | 1/1971 | Schwartz | |
| 3,708,853 A | 1/1973 | Humen et al. | |
| 3,813,981 A | 6/1974 | Faltin | |
| 3,958,751 A * | 5/1976 | Bruno | B65D 65/22 229/87.08 |
| 3,968,287 A | 7/1976 | Balk | |
| 4,105,724 A | 8/1978 | Talbot | |
| 4,259,385 A * | 3/1981 | Keller | B21D 31/043 428/135 |
| 4,426,343 A | 1/1984 | Vittone et al. | |
| 4,462,292 A | 7/1984 | Pearl | |
| 4,550,046 A | 10/1985 | Miller | |
| 4,596,541 A | 6/1986 | Ward, Sr. et al. | |
| 4,615,671 A | 10/1986 | Bernal | |
| 4,832,228 A | 5/1989 | Hickey | |
| 4,921,118 A | 5/1990 | Gass | |
| 4,989,487 A | 2/1991 | Staley | |
| 5,061,344 A | 10/1991 | Wedin et al. | |
| 5,365,819 A | 11/1994 | Maida et al. | |
| 5,399,049 A | 3/1995 | Abe et al. | |
| 5,538,778 A | 7/1996 | Hurwitz et al. | |
| 5,647,257 A | 7/1997 | Maida et al. | |
| 5,667,871 A | 9/1997 | Goodrich et al. | |
| 5,688,578 A | 11/1997 | Goodrich | |
| 5,782,735 A | 7/1998 | Goodrich et al. | |
| 5,906,149 A | 5/1999 | Montenegro Criado et al. | |
| 5,910,079 A | 6/1999 | Watanabe | |
| 6,989,075 B1 * | 1/2006 | Kao | A61Q 19/00 162/125 |
| 7,045,196 B1 * | 5/2006 | Hill | B32B 29/08 428/137 |
| 8,486,507 B2 * | 7/2013 | De Luca | B29C 44/5654 428/136 |
| 8,613,993 B2 | 12/2013 | Kuchar | |
| 2014/0027553 A1 * | 1/2014 | Page | B65H 16/005 242/159 |
| 2014/0130997 A1 | 5/2014 | Klerelid | |
| 2015/0122866 A1 | 5/2015 | Kuchar et al. | |

OTHER PUBLICATIONS

Extended Search Report (Supplementary) dated May 24, 2020, issued in counterpart EP Application No. 14843068.9 (9 pages).
International Search Report dated Dec. 25, 2014, issued in Application No. PCT/US2014/054615 (6 pages).

* cited by examiner

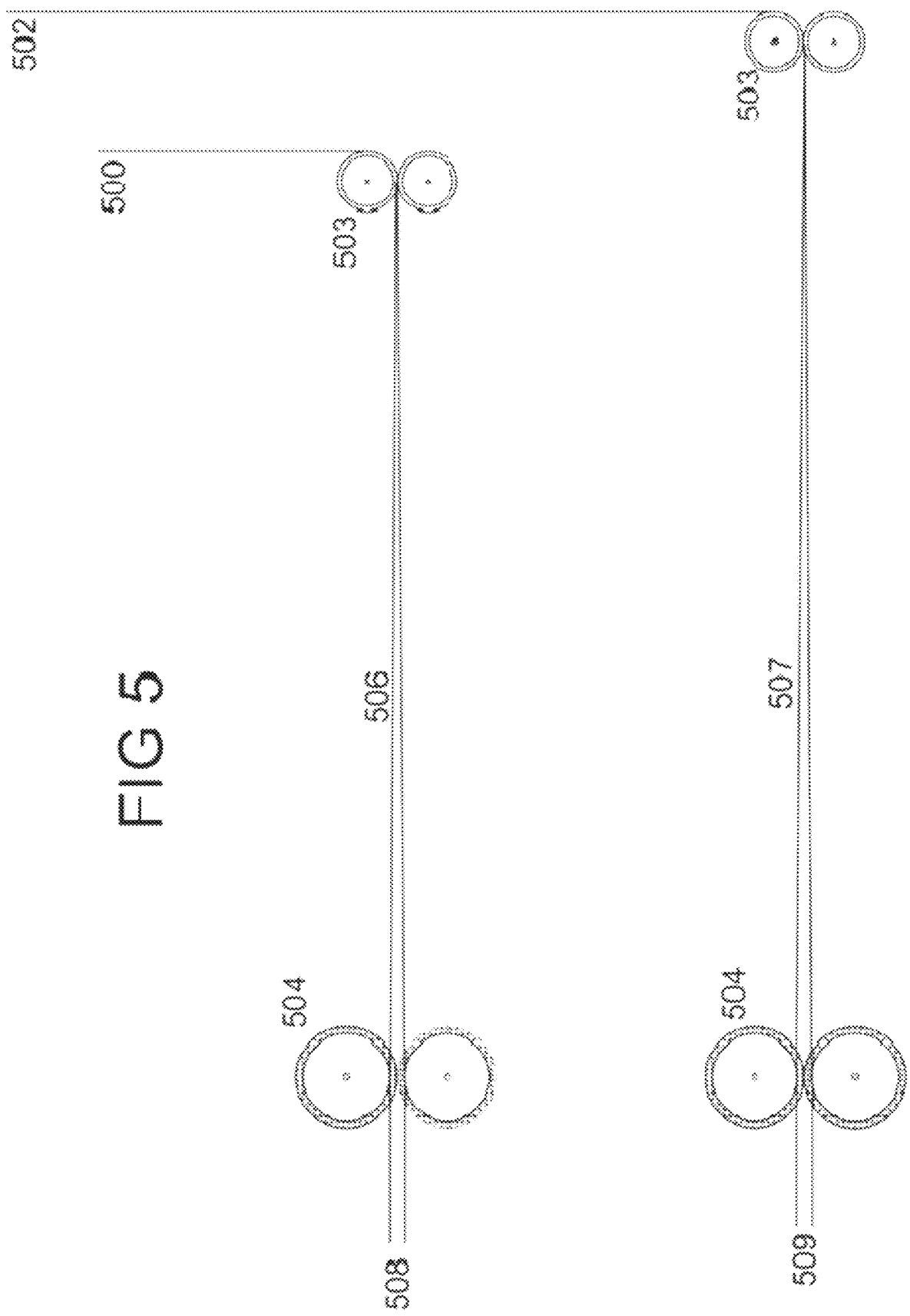

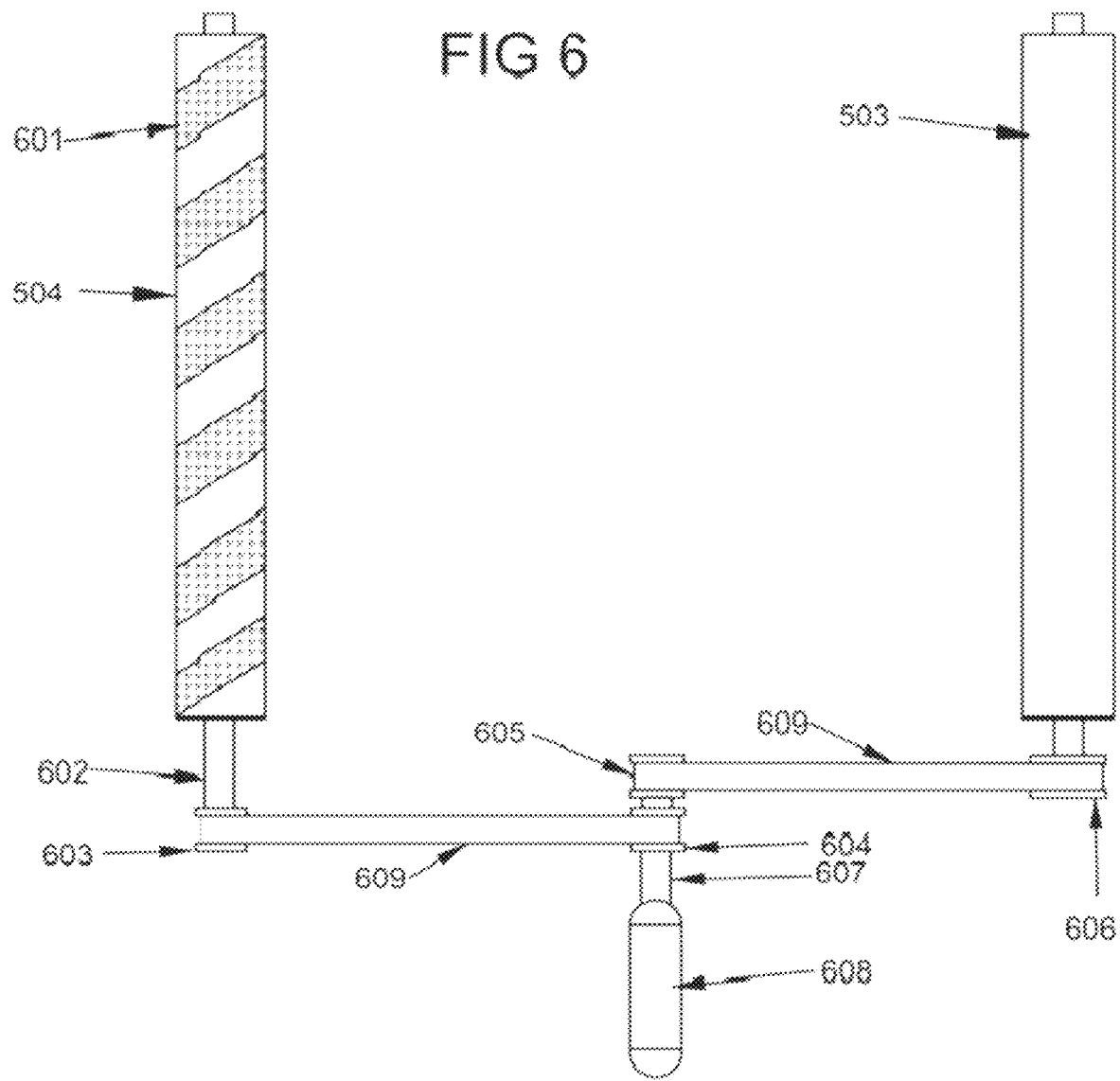
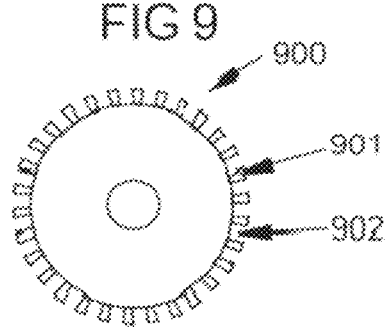

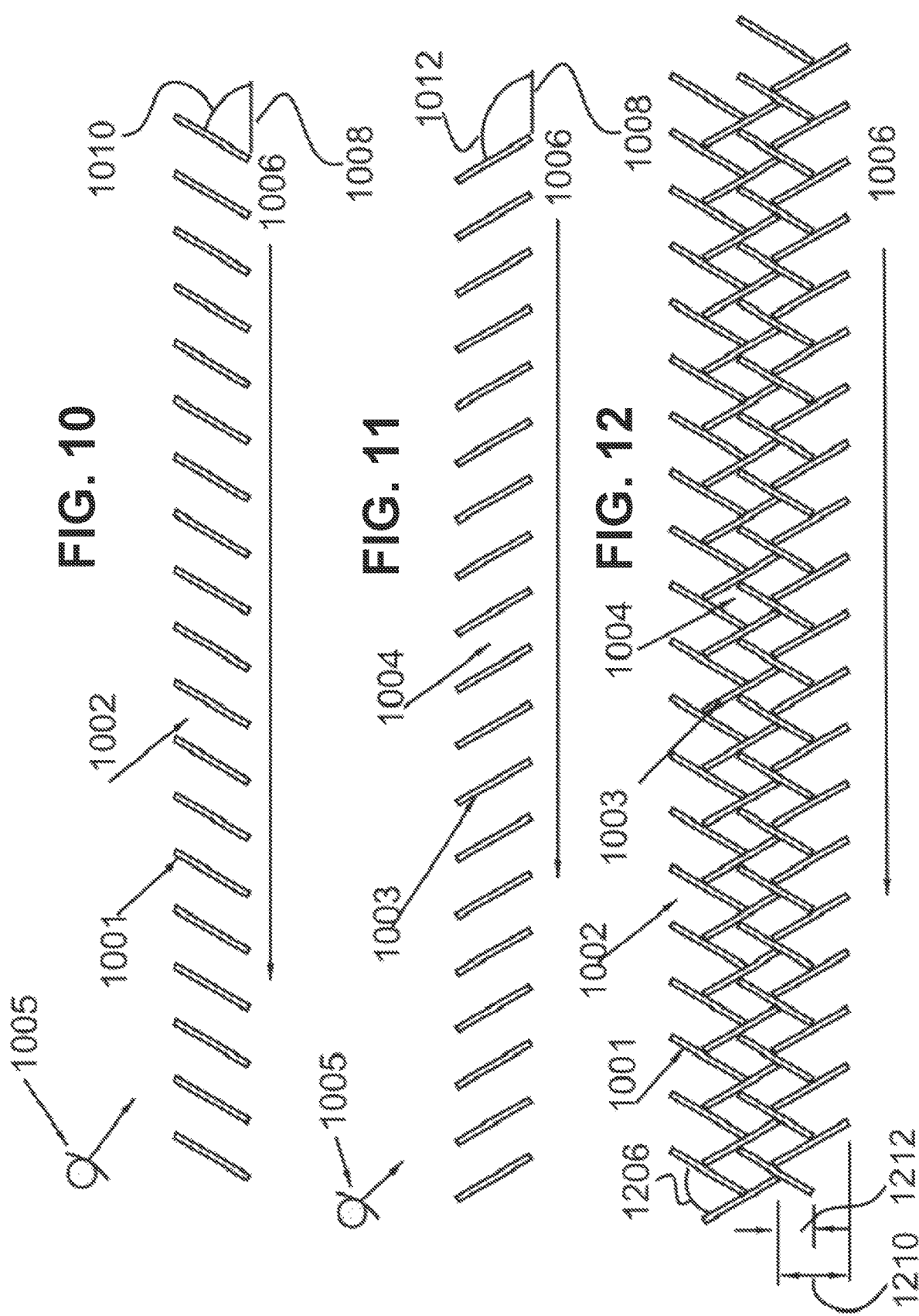

EXPANDABLE SLIT SHEET PACKAGING MATERIAL THAT INTERLOCKS WHEN LAYERED AND EXPANDED

This application claims the benefit of the filing date of U.S. Provisional Patent Application 61/874,873, filed Sep. 6, 2013 for "Interlocking Expandable and Expanded Slit Sheet Packaging Material", the disclosure of which is incorporated herein by reference, as though recited in full.

BACKGROUND OF THE INVENTION

Field of the Invention

This invention relates to a paper packaging material that is slit, expanded, and layered around an object or used as a void fill.

Description of the Prior Art

There are a small number of in-the-box wrapping products found in the market today used to fill the open area within a box that is unused by the item being shipped. Wrapping an item to be shipped puts a barrier between it and the box. It also creates a larger cubic area as it sits within an adjacent void-fill product such as Styrofoam peanuts. The larger cubic area cushions as well as inhibits migration of the item to the sides of the package.

Pleated Paper of U.S. Pat. No. 6,871,480 teaches using pleated paper laminated to one or more outer layers of tissue paper as a cushioning product. The pleat height, paper fiber length, and number of pleats per foot, provide a cushioning product that crushes as force is applied. This application teaches the use of pleated paper as a wrapping material.

Bubble Wrap®, well known in the art, can be obtained with 2" to 1" tall bubbles for the use as a wrap and void fill. It is capable of very good cushioning if made from a copolymer that is not recyclable or is very difficult to recycle. Homeowners are not able to recycle this type of plastic easily.

U.S. Pat. Nos. 5,667,871 and 5,688,578, teach the use of a plurality of individual slits forming parallel spaced rows forming a hexagonal expanded sheet with and without a separator sheet. It requires machinery to stretch the paper into its three dimensional shape at the customer's location such as disclosed in U.S. Pat. No. 5,538,778 which teaches the method and apparatus for producing the expansion of the slit sheet material performed at the packing site's location. This material is effective when used in conjunction with the separator sheet but, the separator sheet does not add to the thickness of the material. Additional background information is disclosed in U.S. Pat. No. 5,782,735 relating to slit sheet packaging materials.

SUMMARY OF THE INVENTION

A main object of the present invention is to overcome the shortcomings of the prior art.

In accordance with a broad embodiment of the invention, a novel paper product is comprised of two or more slit sheet packing material layers, each layer having its own slit pattern design to create interlocking layers of expansion sheet packaging materials. Each layer expands to create a three dimensional open netting of cells of hexagons, and the like, and is designed to have limited nesting with its opposing layer, thereby maximizing the thickness of the combined layers as compared to nested layers.

In accordance with a broad embodiment of the invention, adjacent layers have differing slit patterns and can be expanded through expander type machinery such that the expansion rates of the differing slit pattern layers can be varied to deliver the same width of exiting expanded material from each layer. Preferably the differing slit patterns produce when expanded, inclined land area that have the same number of rows per inch, but different angles of inclination of the land areas, such that adjacent layers can interlock, that is, have a restricted amount of nesting. Nesting to an extent sufficient to provide interlocking, is in the range from about 10 to 20% and preferably about 9 to 15%.

In accordance with a broad embodiment of the invention, adjacent layers have differing slit patterns and can be expanded through expander type machinery such that the expansion rates of the differing slit pattern layers can be varied to deliver the same width of exiting expanded material from each layer. Preferably the differing slit patterns produce when expanded, inclined land areas that have about the same number of rows per inch, but different angles of inclination of the land areas, such that adjacent layers can interlock, that is, have a restricted amount of nesting and where the angle of inclination of the first layer is in the range from 50° to 85° and the angle of inclination of the second layer is in the range from 130" to 95°. Preferably, the angle of inclination of the first layer is in the range from 55° to 75° and optimally in the range from 55° to 65°. Preferably, the angle of inclination of the second layer is in the range from 125° to 105° and optimally in the range from 125° to 115°.

In accordance with another embodiment of the invention, adjacent layers have substantially the same slit patterns that produce sheets which when expanded the first layer has lands that are at an angle in the range from 50° to 85° and the angle of inclination of the second layer is in the range from 130° to 95°. Preferably, the angle of inclination of the first layer is in the range from 55° to 75° and optimally in the range from 55° to 65°. Preferably, the angle of inclination of the second layer is in the range from 125° to 105° and optimally in the range from 125° to 115°. It should be noted that the angle of inclination of the second layer is a mirror image of the angle of inclination of the first layer, thus, if the first layer has an angle of inclination of 60°, the second layer has an angle of inclination of 120°. In this embodiment, the sum of the angles of inclination of the first and second sheet is 180°.

In accordance with a further embodiment of the invention, the slits are cut to form a straight line cut at one edge of the slit and an angled cut along the other edge of the slit, thus producing a wedge effect cut. The wedge effect is sufficient to produce a slit pattern that upon expansion consistently forms a uniform angle of inclination along the entire length of the slit paper.

In accordance with another embodiment of the invention, sheets of paper or plastic are slit in a pattern, that upon expansion, form an expanded slit sheet as described in U.S. Pat. No. 5,538,778 (see for example, FIGS. 1 and 2), and U.S. Pat. No. 5,782,735 (see for example, FIGS. 19 and 20). The slit sheets are formed into rolls. A first roll is unrolled clockwise and expanded and a second roll is unrolled counterclockwise and expanded. Preferably, the two rolls are expanded simultaneously in an expander device which produces two adjacent layers of interlocking expanded sheets having cells, wherein the cells have land areas that are inclined relative to unexpanded sheets, and wherein the angle of inclination of one of the adjacent expanded sheets is the mirror image of the angle of inclination of the other expanded sheet. The expanded, interlocking sheets are wrapped around an object, to form at least four layers of expanded sheet material, that is, two windings of the double layers of expanded sheet material.

In accordance with another embodiment of the invention, one or more layers of slit sheet material can be made from a paper comprising a soft paper such as paper towel type material so that it is soft on the hands while manually manipulating the packaging material around items being packaged. Preferably, one layer is of Kraft paper, and the adjacent layer is of a paper towel material.

In accordance with another aspect of the invention, expanded slit sheets are layered such that adjacent sheets uniformly, reliably, and consistently have lands with angles of inclination that are substantially reversed from each other, and interlock over substantially the entire length of the sheets and preferably, over the entire length of the sheets, thereby producing an improved packing material as compared to prior art products. Preferably the angles of inclination one of the adjacent sheets is the mirror image of the angles of inclination of the lands of the other of the adjacent sheets.

BRIEF DESCRIPTION OF DRAWINGS

The invention will be described with the accompanying drawings, in which:

FIG. 5 is a side view of the expander rolls section within the internal workings of the Automatic Expander.

FIG. 6 is a top view of the expander rolls within the internal workings of the automatic expander.

FIG. 7 is a side view of the belt used to rotate the expander rolls.

FIG. 9 is the side perspective view of an example of one of the gear pulleys used to rotate the expander rolls.

FIG. 10 is a schematic illustration showing a backward orientation of the lead walls of the web.

FIG. 11 is a schematic illustration showing a forward orientation of the lead walls of the web.

FIG. 12 is a schematic illustration showing the combination of a backward orientation of the lead walls of an upper web, a forward orientation of the lead walls of an upper middle web, and a backward orientation of the lead walls of a lower middle web and a forward orientation of the lead walls of a lowermost web.

DESCRIPTION OF THE EMBODIMENTS OF THE INVENTION

Definitions

Figure 8:
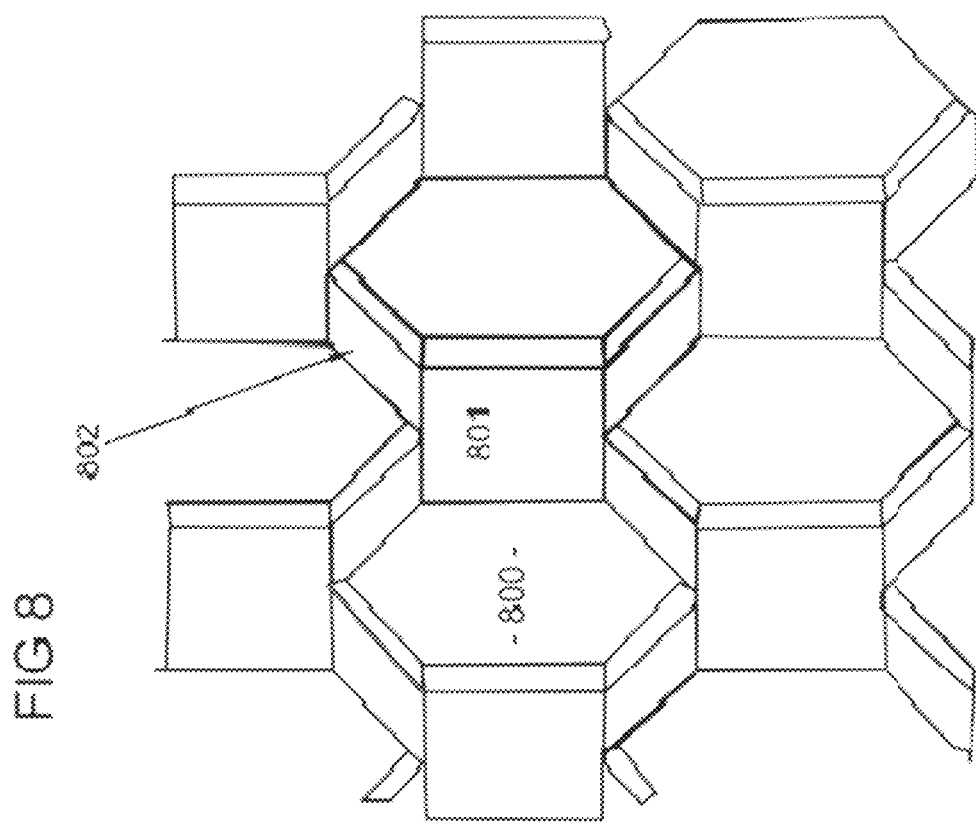
FIG. 8 is a top perspective view of one layer of expanded sheet material.

Where the definition of terms departs from the commonly used meaning of the term, applicant intends to utilize the definitions provided below, unless specifically indicated otherwise.

For the purposes of the present invention, the term "slit sheet material" refers to the use of offset rows of slits that form a hexagonal, or the like, three dimensional paper material that is flexible and can form to the shape of an item needing wrapping.

For the purposes of the present invention, the term "cell" means the hollow three dimensional shape that is created when the slit sheet material is expanded longitudinally.

For the purposes of the present invention, the term "lead wall" means the part of the cell that is the full height of the hexagonal shape created from the expansion of the slit sheet material.

For the purposes of the present invention, the term "angle of inclination" means the angle that the land areas of cells form with respect to the plane of the unexpanded slit sheets, wherein the cells have land areas that are inclined relative to unexpanded sheets, and wherein the angle of inclination of one of the adjacent expanded sheets is the mirror image of the angle of inclination of the other expanded sheet.

For the purposes of the present invention, the term "connecting wall" means the part of the cell that is half the height of the cell created from the expansion of the slit sheet material.

For the purposes of the present invention, the term "cell size" means the open space dimension created when expanding the slit sheet material.

For the purposes of the present invention, the term "slit row spacing" means the distance between the rows of slit and un-slit patterns within the slit sheet material.

For the purposes of the present invention, the term "Kraft paper" means the industry name of paper that is measured in weight for every three thousand square feet of material. Thus the weight of 50 # Kraft Paper would be the weight of 3000 square feet of paper.

For the purposes of the present invention, the term "basis weight" means the specification relating to paper that measures the weight of a certain square foot area of paper. Thus the basis weight of 3000 square feet of Kraft Paper weighing 50 pounds equals a 50 # basis weight. The basis weight of Tissue paper is based on 2,880 square feet.

For the purposes of the present invention, the term "recycled paper" means material that is substantially made from recycled paper in the 90% range or more and is paper that has been returned to the manufacturing process, having once or more been made into a paper product, and remade into a paper sheet.

For the purposes of the present invention, the term "paper fibers" are the individual component of paper that makes up a paper sheet.

For the purposes of the present invention, the term "Nesting" means the grouping of cells onto or into one other such that an upper slit sheet material cell can fit within the lower slit sheet material cell to the point at which the thickness gain is not substantial.

For the purposes of the present invention, the term "interlocking" means the grouping of cells onto or into one another is such that an upper slit sheet material cell can nest within the lower slit sheet material cell only to the point at which the average thickness gain of two layers is no less than 70% of the thickness of both layers of a two layer pair and preferably, no less than 80% of the thickness of both layers of a two layer pair. For example, if each layer is 0.5 inches thick, then the average thickness would be no less than 0.7 inches and preferably no less than 0.8 inches.

For the purposes of the present invention, the term "adjacent" means that two layers are immediately adjoining, that is, one layer overlays the other without intervening space and are touching. Layers that nest or interlock to any degree and having no intervening layers, are accordingly, in contact with each other and therefore adjacent.

The term "pattern of cells of expanded sheets" means the cell shape configurations such as hexagonal or oval, and cell dimensions such as leg length or width. The term "pattern" means physical characteristics and dimensions and is not inclusive of decorative or ornamental features of the design of a pattern.

For the purposes of the present invention, the term "average thickness" is employed to indicate that since some nesting may be present in layers of sheet that are within the definition of "interlocking" as employed here, the thickness of two adjacent layers can vary. Average thickness is measured as the sum of the thicknesses measured at a plurality of linear intervals, divided by the number of intervals in the plurality of linear intervals. Thus, if thickness measurements are taken every inch over a length of two feet, then the sum of the measurements divided by 24 equals the average thickness.

For the purposes of the present invention, the term "interlocking adjacent layers" means that layers are nested to an extent that the contact between adjacent layers is sufficient to resist contraction of expanded sheets. When two layers are interlocked, the contraction from expanded to unexpanded due to the paper's memory, is restricted because one layer is pulling in a first direction and the second layer is pulling in the opposite direction. The degree of nesting depends upon the rigidity of the paper of each of the two layers, and preferably provides at least a 10% overlap (nesting) of the layers such that the thickness of the two layers is no more than 90% of the sum of the thickness of each layer.

For the purposes of the present invention, the phrase "paper width after expansion" means the width of the sheet of paper after expansion of the slit paper sheet. The decrease of the width of the sheet of paper after expansion is referred to as "necking down". The "percent of necking down" is the percent decrease in paper width after expansion. Thus, a 25 inch width sheet which necks down to 20 inches would be necked down 20%.

For the purposes of the present invention, the phrase "paper width differential" means the difference in width of two adjacent layers of slip paper sheets. Since different slit patterns will yield different amounts of necking down, the paper width differential prior to the expansion step must be sufficient to yield little or no paper width differential after the expansion step. It should be understood that the sheets of expanded paper can be trimmed down to negate any paper width differential post expansion. However, this would constitute a waste of paper and require an additional step or steps, and accordingly, it is preferable to negate any paper width differential by determining a pre-expansion paper width differential that achieves, in combination with the slit patterns of each of two adjacent sheets, a substantially identical paper widths post expansion.

For the purposes of the present invention, the term "Operator" means the person that operates the machinery that automatically expands the slit sheet material that dispenses the product towards the operator.

For the purposes of the present invention, the term "switch back" means the reversal of the angle of inclination of the land at some point or points along the length of a sheet of expanded slit sheet material. A reversal of the angle of inclination from +60° to −60° (60° to 120°) constitutes a switch back.

For the purposes of the present invention, the term "wedge effect" means the cutting of a slit to form a slit having a straight line cut along one edge and an angled cut along the other edge of the slit.

For the purposes of the present invention, the term "soft paper" means the particular grade of paper used for absorbing purposes, such as tissues, drying cloths, paper toweling, napkins and handkerchiefs. While these paper products, unlike their woven fabric counterparts, are typically intended for disposable use, in the present invention soft paper is employed for oft feel, smooth structure, and good strength in both dry and wet states.

Slit Sheet Materials

For the purposes of the present invention the descriptions of the paper and slit patterns within the embodiment of U.S. Pat. No. 5,667,871 can be used within this application. The material can be as described in the '871 patent, except that the two differently sized slit patterns are employed in the present invention, rather than just the one pattern of the '871 patent. These two slit patterns substantially negate the nesting problem associated with the prior art U.S. Pat. No. 5,667,871.

Further information relating to the paper which can be used in the present invention, slit patterns, and the expansion process is found in U.S. Pat. Nos. 5,538,778, 5,667,871, 5,688,578, and 5,782,735, the disclosures of which are incorporated by reference herein, as though recited in full.

Each slit pattern will require varying paper strength and thickness to perfect its crush strength and ease of stretching within the automated expander.

The slit pattern dimensions set forth below are one example of the composite products from the two or more varying slit sheet materials. There are a number of slit sheet variations that will work to inhibit nesting and the specific dimensions and shapes created below should not limit the patterns that can be used to make the new art. The critical feature is that the slit patterns of adjacent layers differ in slit length, spacing between slits in a row, and/or the spacing between rows of slits.

The paper used to manufacture the slit sheet material is preferred to be recycled and is in the range of 30-80 pounds in basis weight dependent upon the cell size of the slit sheet expanded material. Virgin paper has longer fibers and will produce a firmer product with equivalent basis weight as recycled paper. Again, depending on the cushioning required one may use a 30 pound recycled paper to obtain a very soft cushion and alternating between recycled and virgin as the paper weight goes up fine tunes the cushioning effect. Additionally, a soft cushion recycled paper can be used for one sheet of the pair of sheets and the other can be a higher weight recycled paper or virgin paper. Kraft paper is manufactured according to the Tappi T-410 (standard of 3,000 Square feet of material per basis weight. As an example a Kraft paper with a basis weight of 40 means that 3,000 square feet will weigh 40 pounds. Interestingly the paper is about 0.004 inches thick but this can vary based on crushing methods to produce different surfaces.

In the case of a cushioning product made from Kraft paper the ideal paper weight, depending on the cushioning requirements is 30 to 90 pounds.

It is preferred to use the slit pattern that is approximately three-to-one in size between the length of the slit portion and the un-slit portion of the slit sheet material. In this instance a ½" slit portion followed by a 3/16" un-slit portion is a preferred pattern in the first row. Each row is ⅛" apart and bisects or is transverse to the direction of manufacturing the slit sheet material. Each slit pattern row below is offset to the above pattern such that the slit portion bisects the unslit pattern of the upper row and so forth. This alternating pattern enables the paper to be expanded in to the web of hexagonal, diamond, square, or round shaped three dimensional cells that are created dependent upon the specific slit pattern. A hexagonal pattern is created with the approximate three-to-one slit to unslit lengths. It has been established that the hexagonal shape is the strongest of all the cell shapes and therefore is the preferred embodiment to the new art. There are exceptions when a softer cushioning material is required where one of the slit sheet materials is a hexagonal layer with the adjoining layer slit sheet designed to be a square. In this instance the preferred embodiment is for both layers to substantially create hexagonal cells.

The second layer of slit sheet material will be of the same three dimensional thickness. The thickness can be created from the spacing of the rows. In this instance the spacing is ⅛ thus creating ¼ long cells. Because these cells can only rotate short of 90 degrees toward a vertical orientation, the total height is approximately 3/16" overall. The lead wall of the cell is the portion of the cell that makes up the full depth of the slit sheet when expanded. There are two lead walls created no matter what shape the cells create or slit pattern used. These two lead walls face the direction of manufacture and the surface area is made up of the un-slit area within the row and the space between the rows times 2. The depth of the lead wall can also be described as the unslit space between every other set of rows or between the first and third rows.

The overall height of the expanded slit sheet material can also be described as a series of rows such that the first row of slits at position "O" is followed by its offset un-slit portion of the row underneath at position ⅛" below and not until the third row appears and the offset again places a slit at position ¼", thereby creating a total height of ¼" for the lead walls of the hexagonal cell.

EXAMPLES

The first slit sheet pattern creates a ¼" tall lead wall with each hexagonal side approximately being 3/16" long. The second slit sheet pattern is also 1/" tall by using the ⅛" row spacing. The legs of the cell are approximately 10 to 30% less or more to create an interlocking composite product. In this case the preferred size would be 0.4" slit×0.15" unslit creating a cell that will be 20% smaller than the first slit sheet pattern.

The second expanded slit sheet pattern creates a cell that easily could fit inside the first expanded slit sheet material but is inhibited by the increase in quantity of the smaller cell size causing 1.2 cells trying to fit within one cell of the first expanded sheet which, is impossible.

In order for the operator to receive both slit sheet expanded materials at the same speed a special expander is required. The first expanded sheet layer expands from 1° to approximately 2⅛" inches depending upon paper strength and thickness. In the present invention the 60 pound basis weight paper expands to the 2⅛" inches for the ½"×3/16 first slit sheet layer. This is an approximately 213% increase in the length of the slit sheet material and the expander will need create this exact expansion property for the first layer.

The second layer will be twenty percent smaller in size and therefore will expand 193% in length. Therefore the second expansion rollers within the expander machinery will have a reduced expansion ratio to accommodate this smaller amount of expansion. This reduced expansion ratio would therefore automatically reduce the smaller secondary web layer speed exiting from the expander. To maintain the same exiting speed for both layers the back rollers that set the overall exit speed will have to be adjusted to 20% faster for the second layer.

Additionally, slight variations in cell size, of 5 to 10%, can be opened with the same Velcro to rubber roller ratio as the larger cell size due to the slipping effect of the Velcro rollers. As the cell size grows the effect is minimized and either a larger cell is not opened fully for maximum benefit or a small cell shows tears or complete tearing of the slit sheet material.

With only a slight cell size variation the paper width does not have to be exact such that if one web is slightly wider by no more than 5 to 10% then the efficiency of wrapping is maintained. This would make the loading of the expander easier as the upper web could be the lower web and visa-versa and the only difference would be the cell size on the upper web may change from smaller to larger or visa-versa.

Two expanded slit sheets with a tissue separator have a thickness that is theoretically 3/16"+3/16"=6/16"(0.375"), but has been measured to be 11/32" or 0.344". By way of contrast two interlocked layers of expanded sheet material, in accordance with the present invention measured at 3/16"+3/16° to produce a thickness of 5/16" or 0.3125". The loss of thickness of the two interlocked layers of expanded slit paper represents the amount of interlocking of the two adjacent, over-laid sheets of expanded slit paper of the present invention.

While this represents a 9% loss of thickness, it has been found that in use, the expanded slit sheets with a tissue separator tends to flatten due to the cells having limited rigidity under a load and has a tendency to retract. By way of contrast, the interlocking design of the present invention, as compared to the tissue separated design of the prior art, is more resistant to deformation under load, more resilient, and resists retraction. It has been found that in use, the design of the present invention produces a wrap that is thicker than the tissue separated design of the prior art, presumably because of its ability to retain its thickness, in contrast to the tissue separator configuration. The tissue separated design of the prior art, has been found to generally retain less than 75% of its expanded length, whereas the crisscross pattern of the present invention tends to retain greater than 75% of its fully expanded length.

In another 12 layers with zero nesting has a thickness of 2.25", were each expanded sheet layer has a thickness of 0.1875" (0.1875×12=2.25". example 12 layers have a thickness of about 2", representing a loss of thickness of about 11%. Thus, preferably, the nesting is limited to 10 to 20% and most preferably it is limited to 9 to 15%.

Expander

The concept of the expander is to continuously feed the slit sheet layers to the operator and simultaneously expand those layers for ease of use. Otherwise the operator would have to manually pull the layers on a repeating basis as more flat layers of slit sheet material are delivered. To facilitate this two rolls approximately 1O" apart from the front to the back of the machine operate at different speeds. A separate set of rubber coated feed rollers drive the first slit sheet material into the expander. The second set of expander rollers at the front of the machine are Velcro coated, grab the slits, and drive the slit sheet to its expanded configuration by operating 213% faster than the back rollers. The second slit sheet material will feed into an additional set of feed rollers and expander rollers that will set the ratio of 193%. In addition, the back rollers as well as the front rollers will operate 20% faster than the first set of rollers for the first slit sheet material. The design of the drive system shown in FIGS. 6, 7, and 9 are with the use of a timing belt and corresponding gear pulley design. This does not preclude the design of typical flat or no-teeth belt designs which provide can slip when under load.

Soft Paper

The slit sheet material can be made from a variety of papers including Kraft Papers, recycled and virgin papers and the like. These papers when expanded form sharp edges that are sharp to the operators hands and cause cuts to the skin. In most instances the operators where gloves when using slit sheet expanded paper materials. The new art as described below reduces or eliminates the sharp edges to the paper by utilizing a different type of paper yet used in the manufacture of slit sheet paper.

The manufacturing of Soft Paper is described in prior art U.S. Pat. No. 5,061,344 for a "Method of making Soft Paper". For example, '344 describes Soft paper from cellulose fibers as being manufactured by wet-forming a first fiber layer. Thereafter air-borne dry fibers are deposited directly on one or both sides of the wet-formed layer while this is still wet, so that a second and possibly a third fiber layer are formed on the first one. Fiber bindings thereby arise between the layers. The wet-formed layer gives the soft paper its strength, while the dry-formed fibers give a soft surface. The disclosure of U.S. Pat. No. 5,061,344 further describes as another method of forming soft paper, dry-forming. In dry-forming, dry paper-making pulp is fluffed to form fibers which are suspended in air. The air-borne fibers, without addition of water or other solvent, are deposited on an air pervious wire, and these fibers are bound together by means of a suitable chemical binding agent or agents which are added thereto. Further manufacturing details are described in the "DETAILED DESCRIPTION" of the '344 patent. The disclosures of U.S. Pat. No. 5,061,344 are incorporated herein by reference as though recited in full. Additional information regarding soft paper is disclosed, for example, in publication US 2014/0130997, the disclosures of which are incorporated herein by reference as though recited in full.

This is one design for making soft paper and can be utilized for expanded sheet material as it has good fiber strength and can be expanded into its three dimensional cell form. The use of this paper is within the range of 40 to 90 # basis weight with the paper fibers running in the machine direction for good expansion strength. The soft paper thickness is thicker than typical Kraft paper thicknesses, as well known in the art, with soft paper thicknesses varying from 0.006" to 0.012". The preferred basis weight for the soft paper is about 70, with a thickness of about 0.010".

Figure 1:
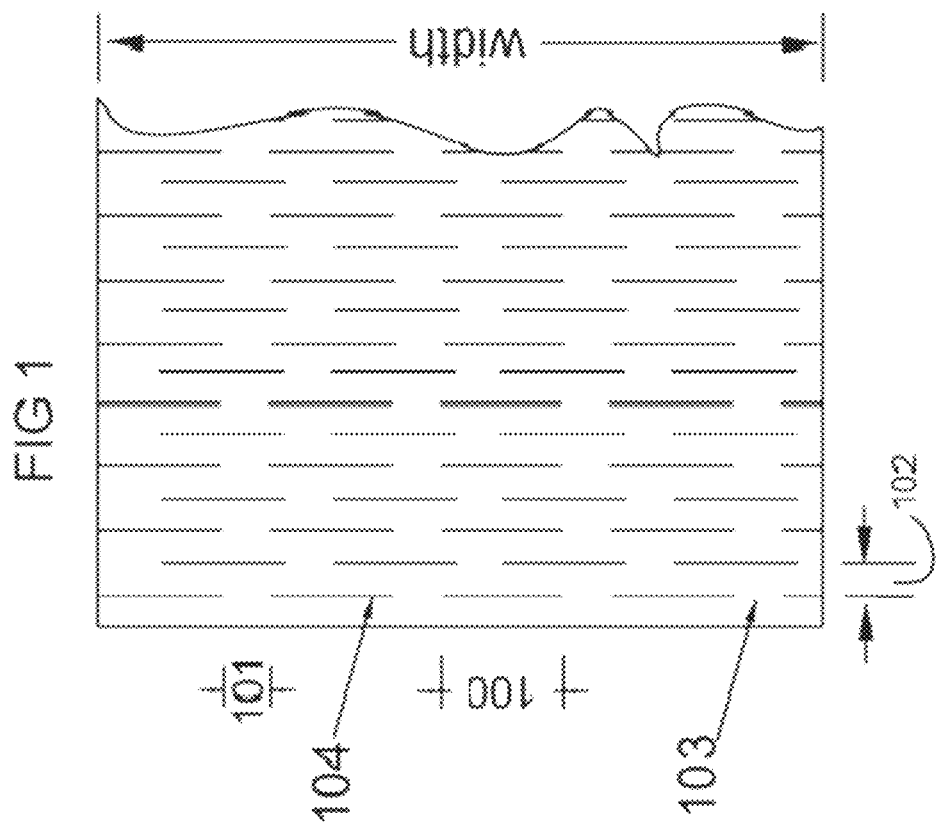
FIG. 1 is a top view of one of the layers of unexpanded slit sheet paper material.

FIG. 1 is the top view of one layer of the slit paper prior to expansion with 100 being the width of the slit and 101 being width of the unslit dimension. 102 is the distance between the rows.

FIG. 8 is the top view of one layer of the slit sheet expanded to its three dimensional form with 800 being the open cell area created by the expansion, 801 being the lead wall or land created, and 802 being the connecting leg. It is noted that the terms lead wall, land wall, land area and land are used interchangeably to indicate the region 801.

Figure 2:
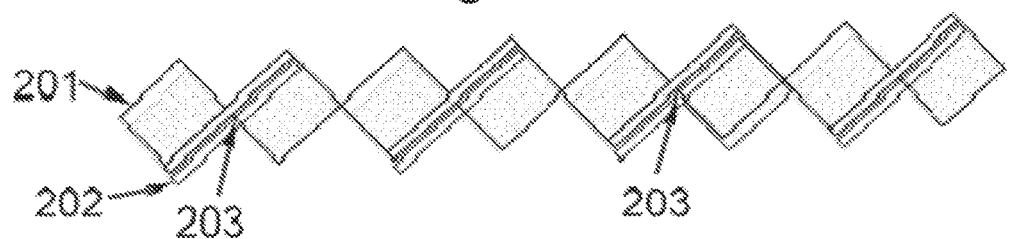
FIG. 2 is a side view of two identical expanded slit sheet paper materials as they rest on top of one another.

FIG. 2 is the side view of slit sheet expanded material, in accordance with the prior art, showing the nesting of two identical layers 201 and 202, with reference number 203 showing the virtually complete contact between the two layers.

Figure 3:
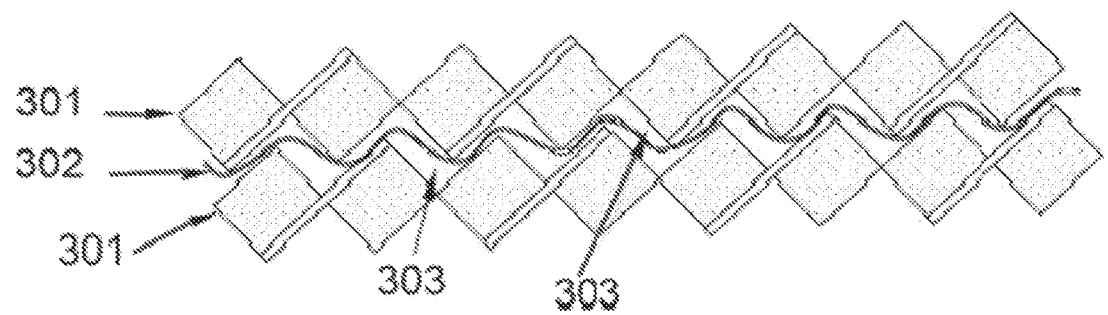
FIG. 3 is a side view of two identical expanded slit sheet paper materials with a separator sheet between the layers as they rest one on top of the other.

FIG. 3 is the side view of the use of a separator sheet, in accordance with the prior art, that negates nesting in accordance with the prior art use of a separator sheet 302 between two expanded sheet 301, The reference number 303 indicates the open space between the separator sheet 302 and an expanded sheet 301.

Figure 4:
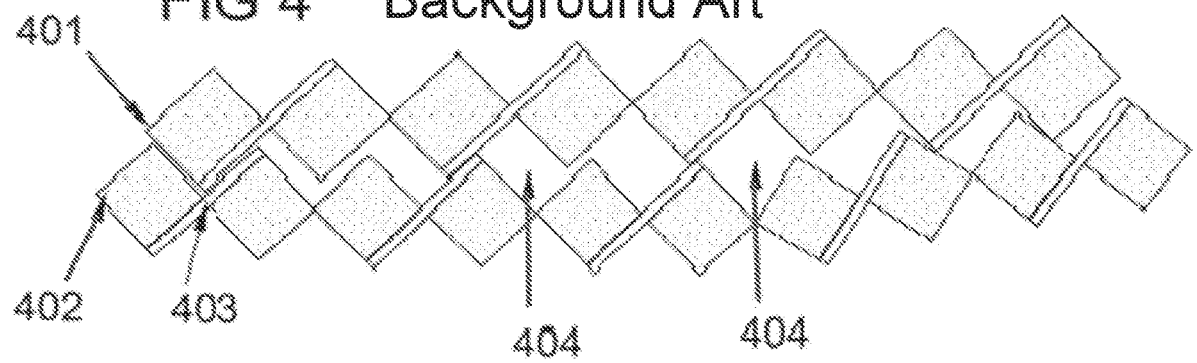
FIG. 4 is a side view of two differing expanded slit sheet paper materials placed one on top of the other.

FIG. 4 is a side view of two expanded layers 401 and 402 of the prior art, having regions 403 where side walls of adjacent layer contact each other but nesting is minimized due to the use of differing slit patterns for layers 401 and 402. Reference numeral 404 illustrates the open space between adjacent layers of expanded sheets which has been substantially maximized due to the differing slit patterns for layers 401 and 402. It should be understood, that in use, the dimension difference between the cells of sheets 401 and 402 should be greater than illustrate in order to negate nesting to a greater extent than illustrated in FIG. 4.

FIG. 5 is a side schematic illustration of an expanding operation in accordance with the present invention. The reference numerals 500 and 502 indicate unexpanded slit sheets driven by pinch rubber rollers 503 into the expander rolls section 504 within the internal workings of the automatic expander. Reference numerals 508 and 509 indicate slit sheets 500 and 502 respectively, in their expanded form. The slit paper is feed counterclockwise from a first roll 1402 and clockwise from a second roll 1400 to provide for reversed angles of the lands in accordance with the present invention.

Expansion rollers 504 employ a hook and loop material 601, such as Velcro®, which covers the front roller section which pulls the slit paper faster than 503 feeds providing the expansion and exiting of the expanded slit paper. It should be noted that the hook layer of the hook and loop material is used rather than the loop portion of the hook and loop material. The driving process is precisely driven with motor 608 that turns drive shaft 607 that has attached two identically drive gear pulleys 604 and 605 that engage the teeth of the drive belt 609. Timing belt 609 turns gear pulley 603 that is precisely sized to create the 213% ratio to drive pulley 606 attached to timing belt 609.

FIG. 7 is a schematic side view of the timing belt 609 and its corresponding teeth 701 that interact with the gear pulleys in FIG. 6 drive gears 603, 604, 605, and 606 that are precisely sized to create the varying speeds that provide the expansion and exit speeds. FIG. 7 shows belt 609 used to rotate the expander rolls 504 and the feed drive rolls 503. Timing belt 609 turns 504 faster than 503 due to diameter difference for the guides for the two rollers. FIG. 9 is the side perspective view of gear pulley 900 that corresponds in varying sizes to gear pulleys 603, 604, 605, and 606 in FIG. 6. The teeth 901 create the open areas 902 that create the space for the timing belt in 609 FIG. 7 to mesh continuously creating a perfectly timed ratio as the expander system is turned. Gear teeth 701 of FIG. 7 fit within the open spaces between teeth 901 and create the precise drive speeds required.

In one embodiment one layer can be the soft paper, and the other Kraft. If the slit pattern of the soft and Kraft are the same, the cells would nevertheless tend to be different because of the characteristic differences between soft paper and Kraft. In any event, the use of cell designs that produce mirror image land regions are preferred. The term mirror image, as employed herein, refers to a cell design which produces a desired angle of inclination and by feeding counterclockwise from a first roll 1400 and clockwise from a second roll 1402, to produce reversed angles of inclinations of the two expanded sheets form the expander. Thus, if the angle of inclination of a first sheet is 60°, then the reverse fed second sheet will have an angle of inclination of 120 degrees, and is identical in form to the first sheet, but with the structure reversed, as by a mirror.

It has now been found that two adjacent cell orientations are directly affected by the wedge effect from the cutting tool. The sharp edge of the tool is where the knife is at its thinnest. In the case of the hard anvil die cutting system the knife edge penetrates the paper to almost the deepest layer of fibers but never touches the anvil. The un-penetrated paper section of paper is then crushed and obliterated into paper dust. This enables a complete cut while dramatically extending the life of the cutting die. The knife is made to have a sharp edge and bevels outward from the edge so that it is sturdy. This bevel creates a wedge effect on the paper. Viewing the paper from the side on which the knife first penetrates the paper, "the slit entrance side", one can see a wider cut versus the underside which has a much finer looking cut. The wedge effect creates this difference and this difference orients the cells to angle reversely from the direction of manufacturing. If one were to look at the expanded slit sheet at the exit of the cutting die (after cutting is achieved) the cell orientation would inhibit one from look through the expanded slit sheet as it is angled back towards the machine.

Utilizing the wedge effect so that the cell orientation is backward combined with roll of slit paper where the die cutting comes from underneath the paper, thereby creating an angled forward slit pattern, the cross interlocking effect can created continuously.

Preferably, a single slitting device is used to slit a plurality of rolls of expandable paper, Two or more layers of slit sheets are fed to an expander, with the rolls being simultaneously fed alternately clockwise and counterclockwise.

The use of cell designs that produce mirror image land regions are preferred. The term mirror image, as employed herein, refers to a cell design which produces a desired angle of inclination and by feeding counterclockwise from a first roll 1400 and clockwise from a second roll 1402, reversed angles of inclinations of the two expanded sheets are produced by the expander, Thus, if the angle of inclination of a first sheet is 60°, then the reverse fed second sheet will have an angle of inclination of 120 degrees, and is identical in form to the first sheet, but with the structure reversed, as in a mirror.

In another embodiment the slit pattern can be the same for both Kraft layers but the speed of the rolls, and consequently the extent to which the layer expand, would be different, and thus would lessen the amount of nesting. It should be noted that the tendency of the two layers to "relax" can cause the cell structures to be the same even though the expansion was different. Thus, the use of different slit patterns is preferred in order to optimize the ability to negate nesting.

It is important to note that the maximum stretch provides the best cushioning. The product works while under tension. It is easier to maintain that tension with the system of the present invention than with the system of U.S. Pat. Nos. 5,538,778 and 5,782,753 because the interlocking of layers serves to maintain the slit sheet under tension.

Pre-expanded material formed in accordance with the system of U.S. Pat. Nos. 5,538,778 and 5,782,753 is not as stretched as much as it should be, There is a limitation to the stretching, due to the tissue and slit paper being on the same roll and therefore cannot be independently tensioned. Therefore the tissue gets taut and the slit sheet paper does not. The new art eliminates the use of the tissue paper separator sheet, in both the expander process or the pre-expanded process, a better expansion can be obtained due to the absence of interference from the tissue separator sheet.

The cell opening effect orients the lead wall to be either angled forward in the machine direction or angled backward from the machine direction. Angled forward orients the cells such that if one were to look downward at the cells in front of the expanding web, as the operator would, one would be able to see through the slit sheet material. If the angle is backward then the operator would see the rows of lead walls such that it is not possible to see through the expanded sheet material.

Attention is invited to FIG. 9 of U.S. Pat. No. 5,699,578 which illustrates the angled orientation of the cells of the expanded slit paper and the nesting that occurs when one sheet is laid over another layer of expanded slit paper having substantially the same angled orientation.

It has now been found that orienting the rolls of unexpanded slit sheet material onto the rollers of the expander such that the exit surface of a first slit paper sheet faces the exit surface of the other sheet, or the slit entrance surface of a first slit paper sheet face the slit entrance surface of the other sheet, upon expansion, creates a crisscross pattern of expanded sheets. This crisscross pattern creates a more resilient and firmer material then two sheets oriented in the same direction. The crisscross expanded sheets can nest to some degree, up to approximately 50% but due to the increase in resiliency the product becomes actually stronger and not able to nest further. Lighter weight paper can be used to maintain the same resiliency as non-crisscross product as well as reducing costs in paper and tooling. The degree of nesting is directly related to the angle of inclination of the lands schematically represented in FIGS. 10-12. Looking now at FIG. 10 the lead walls/lands 1001 are oriented backward to the manufacturing direction 1006 which is also the direction the expanded sheets exit the expander. This causes the eye of an operator 1005 facing the web to be inhibited from seeing through the expanded sheet but see the surface areas of the lead walls 1001.

Looking now at FIG. 11 the lead walls 1003 are oriented forward in the manufacturing direction 1006 which is also the direction the expanded sheets exit the expander. This causes the eye of an operator 1005 facing the web to be able to see through the expanded sheet layer.

FIG. 12 combines the forward and backward layers of FIG. 10 and FIG. 11 to create a crisscross pattern with the lead walls in the backward direction interacting and bisecting lead walls 1003 leaving open spaces 1002 and 1004.

As shown in FIG. 12, a first layer having lead walls 1001 are oriented backward to the manufacturing direction 1006, that is, the direction in which the paper travels during the slitting operation. With respect to the plane of the slit paper the lead walls 1001 are oriented backward thus forming an angle of less than 90° to the plane of the paper while the forward oriented lead walls form an angle of greater than 90° to the plane of the paper. In FIG. 12, 1210 indicates the thickness of the bottom layer, and 1212 indicates the amount of nesting.

The arc represented by reference number 1206 thus must be much greater than 0° and much less than 180°, and can range from 135 to 15 degrees, and preferable from 90 to 30 degrees, and most preferably is in the range from 60 to 30 degrees. It should be understand that the arc can vary slightly across regions of the paper but the angle of an inclined land must not reverse or "switch back" to the reversed angle of inclination. It should also be understood that the closer the angle of the lead walls/lands to the vertical, the thicker the composite structure.

The arc represented by reference numeral 1010 can range from 50° to 85° and the angle of inclination 1012 of the second layer is in the range from 130° to 95°. The angles of the lands 1001 and 1003 are relative to the plane 1008 of the unexpanded sheet material. Preferably, the angle of inclination of the first layer is in the range from 55° to 75° and optimally in the range from 55° to 65°. Preferably, the angle of inclination of the second layer is in the range from 125° to 105° and optimally in the range from 125° to 115°, The angles of inclination of the two adjacent expanded sheets can be different, provided that they are in ranges previously noted, and provided the slit patterns, though different, produce at least about the same or the same number of lands per inch such that the adjacent lands interlock as shown in FIG. 12. Thus, angles of inclination 1010 and 1012 can be different, provided the cell dimensions produce consistent interlocking as illustrated in FIG. 12. The space 102, as illustrated in FIG. 1, can be varied to produce varying angles of inclination.

In another embodiment of the invention, adjacent layers have substantially the same slit patterns that produce sheets which when expanded, the first layer has lands that are at an angle in the range from 50° to 85° and the angle of inclination of the second layer is in the range from 130° to 95°. Preferably, the angle of inclination of the first layer is in the range from 55° to 75° and optimally in the range from 55° to 65°. Preferably, the angle of inclination of the second layer is in the range from 125° to 105° and optimally in the range from 125" to 115°. It should be noted that the angle of inclination of the second layer is a mirror image of the angle of inclination of the first layer, thus, if the first layer has an angle of inclination of 60°, the second layer has an angle of inclination of 120°. In this embodiment, the sum of the angles of inclination of the first and second sheet is 180°.

Figure 13:
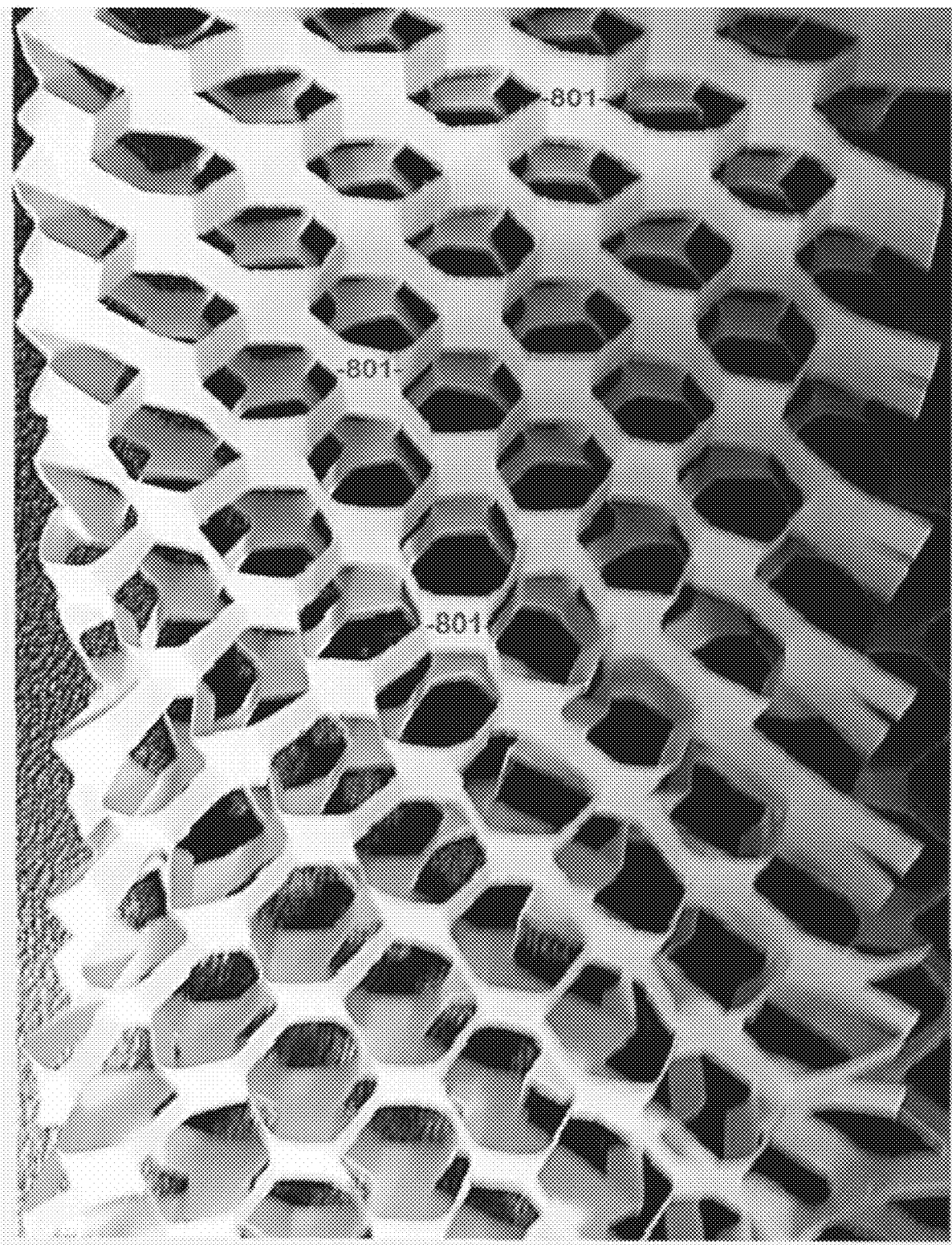
FIG. 13 is a photographic representation of the combination of a forward and rearward oriented layer of expanded slit sheet material.

FIG. 13 shows that the reverse orientation of the adjacent layers of expanded sheet material serves to reduce nesting. It has been found that the low level of nesting which is exhibited by the mirror image adjacent layers serves to reinforce the composite structure due to an interlocking effect. Nevertheless the result is a thicker composite structure than is obtained from a composite structure in which is not cross-expanded. The term "cross-expanded" as applied to a composite expanded slit sheet material means a structure in which there is a combination of a backward orientation of the lead walls of a first expanded slit sheet or web and a forward orientation of the lead walls of an adjacent web, as shown in FIG. 13.

The cell dimensions are selected to provide the minimum amount of overlap of layers, that is, minimum nesting, in order to get the maximum product height. However, there must be overlap of layers to get sufficient interlocking. The amount of overlap depends on the angle of the lands that are interlocking. The interlocking of the reversed angle layers serves to inhibit retraction of expanded sheets and provides optimum product resiliency.

Looking at the system from another angle, you want 100% retained expansion but that is not feasible. The interlocking system of the present invention can provide at least 75% retention of expanded length as compared to less than 75% retention of expanded length using the system of U.S. Pat. No. 5,688,578. The controlled/limited interlocking of layers changes the properties of the wrap compared to the interleaf design because it resists flattening of the layer when under a load. In the interleaf design, the two peripheral nest regions merely nest without resisting flattening of the layers under load. The present invention produces a product having greater resiliency and load bearing capacity as compared to an interleaf design.

Figure 14:
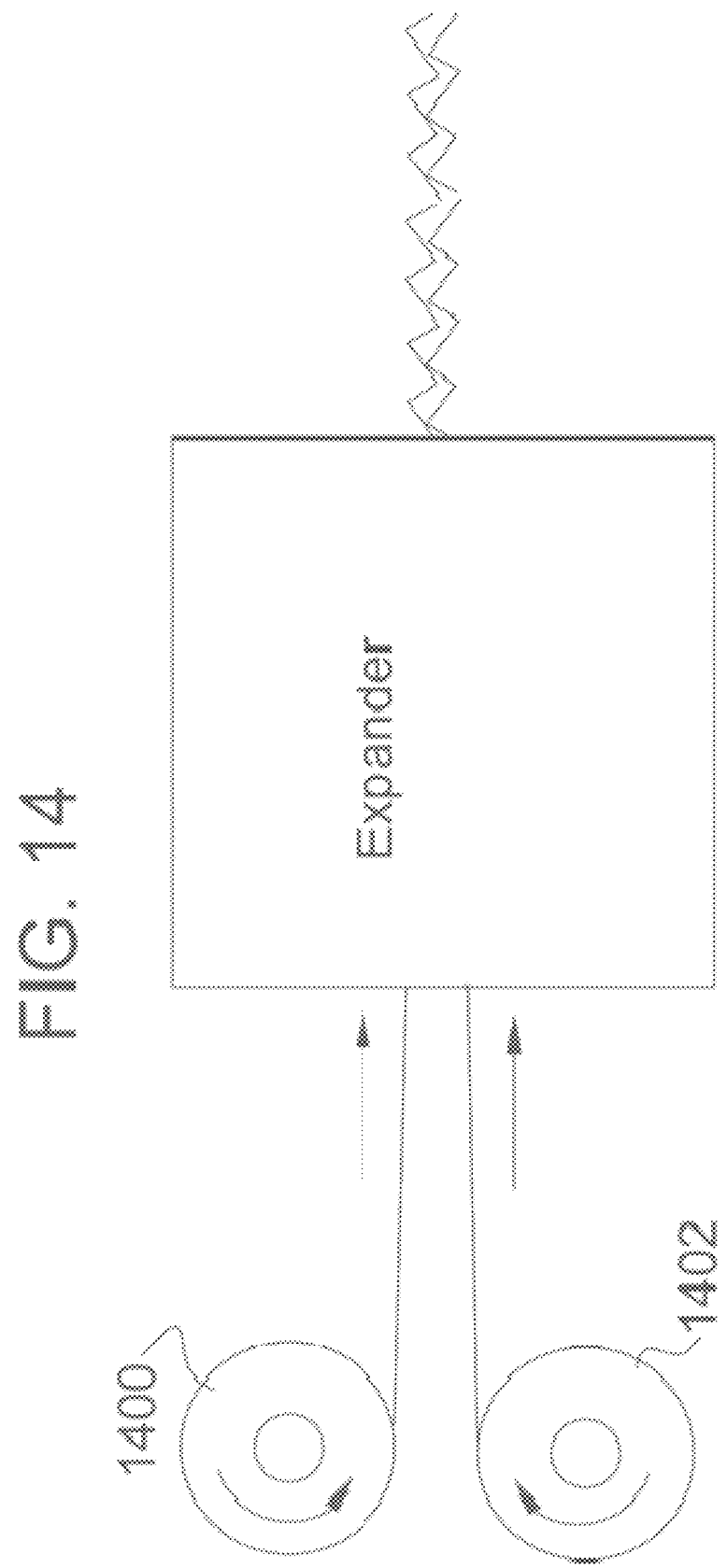
FIG. 14 is a schematic representation of the rollers for feeding unexpanded slit sheet material to an expander.

As illustrated in FIG. 14, the feed roller 1400 is seen to rotate counter to feed roller 1402 thus orienting the rolls of unexpanded slit sheet material onto the rollers of the expander such that the exit surface of a first slit paper sheet faces the exit surface of the other sheet, or the slit entrance surface of a first slit paper sheet face the slit entrance surface of the other sheet, upon expansion, creates a crisscross pattern of expanded sheets. The expansion process with the Expander of FIG. 14 is illustrated in FIG. 5.

Interlocking of Adjacent Layers of Expanded Slit Sheets

Both the slit sheets of U.S. Pat. No. 5,782,735 and those of the present invention, cannot line up perfectly to get maximum height, No flexible slit sheet product could align legs on each other that are at 900 with respect to the plane of the unexpanded slit sheet material. Thus, the maximum thickness of a layer of expanded sheet material is less than the height of land areas that are at 90°.

Figure 20:
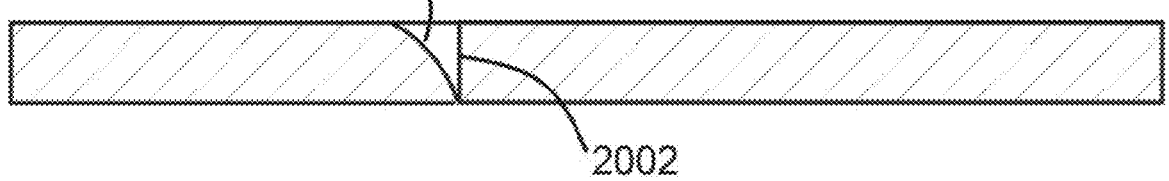
FIG. 20 is a cross-sectional view of slit showing a greater wedge effect cut than illustrated in FIGS. 19 and 19A.

The lands 2020 and 2032 of FIG. 20 of '735 want to nest because there is a perfectly sized cell of the upper sheet wanting to perfectly fit into the lower cell especially when under tension. The tension shapes the hexagon and angles it perfectly with respect to the angles of the adjacent layer as illustrated in FIG. 2 of '735.

The product of the present invention employs opposing angles for adjacent layers of expanded sheets and thereby uses the tension to maximize height. As an operator stretches the lower leg of the upper expanded sheet finds its rest towards the top of the lower sheet. With a loss of tension the leg will skip downward but can never fully nest.

By way of contrast with the present invention, the slit sheets of '735 nest completely, or near completely, as diagrammatically illustrated in FIG. 9 of the '735 patent, and thus there is a need for interleaf of U.S. Pat. No. 5,688,578, as illustrated in FIG. 8 of '578.

Manufacture of Slit Sheets

It is essential that the cells open upon expansion to form lands that consistently, uniformly, and reliably align in the same direction as illustrated in FIGS. 10 and 11. It has been found that during the expansion process, the angle of inclination of the lands periodically reverse such that at some unpredictable position along the length of the expanded paper, the angle of inclination of the lands "switch back", from a forward to a rearward inclination and vice versa. The switch back effect causes some regions of a sheet of expanded paper to be inclined as illustrated in FIG. 10, and then reverse to an inclination as illustrated in FIG. 11. The switch back does not occur simultaneously for both sheets of expanded paper and thus there can be regions in which the angle of inclination is the same for both sheets and the cells of the sheets nest in each other.

It has now been found that layers of expanded slit sheets in which adjacent sheets consistently have lands with angles of inclination that are substantially reversed from each other, interlock over substantially the entire length of the sheets and preferably, over the entire length of the sheets, thereby producing an improved packing material as compared to prior art products. Preferably the angles of inclination one of the adjacent sheets is the mirror image of the angles of inclination of the lands of the other of the adjacent sheets.

It has now been found that the method and devices for slitting of the paper has a direct relationship to the tendency of the angle of inclination of the lands to reverse during the expansion step. While it is necessary to produce slit sheets that expand uniformly and consistently over substantially the entire length of the sheets and preferably, over the entire length of the sheets, it is not narrowly critical as to what technique is used to produce slit sheets that uniformly expand to produce a consistent angle of inclination of the lands, that is, free of regions that switch back.

The blade used to slit the paper is beveled to produce a sharp edge and the sharpness must be maintained to prevent the switching effect from causing a reversal of the angle of inclination of the land region of the cells.

The slitting operation can employ blades that press almost through the paper to a hard anvil or blades that cut through the paper to a soft round anvil. The tool and anvil rotate at the same speed as the paper sheet thus cutting with high precision making the slit sheet material. The sharp edge is made with a beveled edge which means that it becomes increasingly narrower until it is a fine sharp edge from the cylinder to the sharp edge. This creates a wedge effect on the paper that it is cutting. Even though the paper is only 0.004 to 0.012" the wedge effect is enough to produce a cell opening effect. The surface of the sheet material that the blade edge initially contacts, that is, the blade entrance surface is called the slit entrance or obverse side of the paper. The surface that the blade exits is called the exit or reverse surface of the sheet material.

The adverse effect of switch back can be obviated by the use of a separator sheet as disclosed in U.S. Pat. No. 5,688,578. It has now been found that the adverse effect of switch back can be obviated through the application of the wedge effect to the slitting operation. The wedge effect must be sufficient to produce slit paper that upon expansion, continuously causes the land regions of each cell to uniformly open without switch back.

The wedge effect increases with increasing thickness of the paper being slit.

The wedge effect increases with increasing included angles of the slitting blades.

The wedge effect is optimized when the wedge effect is limited to one edge or side of a slit. That is, the net wedge effect is based on the difference between the wedge effect on the two edges of a slit, and optimally, one edge is free of the wedge effect. The use of a blade that has one cutting side that forms a 90° angle with respect to the plane of the paper being slit is preferred to obtain a slit in which one edge of the slit is free of the wedge effect. Conversely, increasing the included angle between the two cutting edge surfaces of a blade increases the wedge effect.

Figure 19:
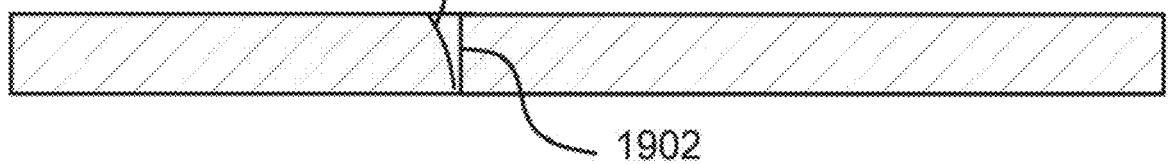
FIG. 19 is a cross-sectional view of slit showing a wedge effect cut.
Figure 19A:
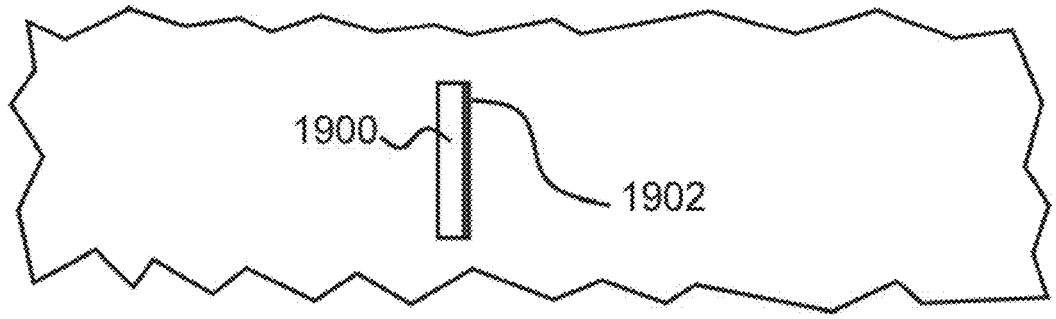
FIG. 19A is a top view of the structure of FIG. 19.
Figure 21:
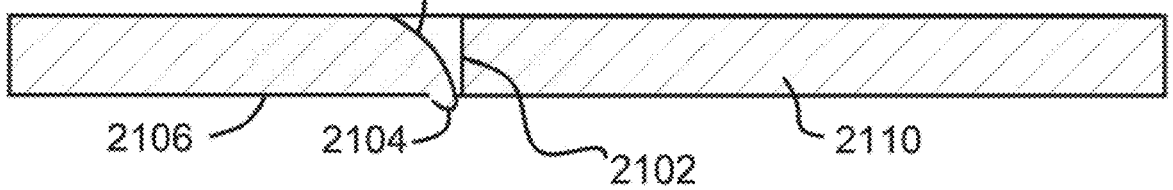
FIG. 21 is a cross-sectional view of slit showing a greater wedge effect cut than illustrated in FIG. 20.

The wedge effect as illustrated in FIGS. 19, 19A, 20, and 21, is shown to be progressively greater from cross-sectional views FIG. 19, to FIG. 20, and to FIG. 21. In FIG. 21, the wedge effect causes a region 2104 of the slit edge 2100 to protrude below the bottom surface 2106 of the slit sheet 2110. FIG. 19A is a fragmentary top view of the slit sheet of FIG. 19, showing the wedge surface 1900 and the straight cut edge of the slit 1902. As indicated above, FIG. 20 is a cross-sectional view of a slit showing a greater wedge effect cut than illustrated in FIGS. 19 and 19A, including a wedge surface 2000 and a straight cut edge of the slit 2002.

Figure 15:
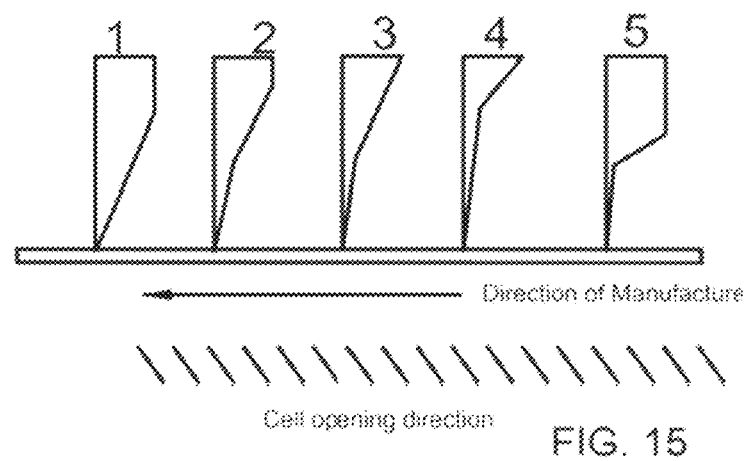
FIG. 15 is a schematic illustrates of slitting blades having varying included angles.

The greater the angle of the bevel of the cutting blades of the slitter rolls, the more consistent the expansion of the slit paper to form lands with an angle of inclination that is consistent along the length of the expanded sheet. A variety of blade designs are illustrated in FIG. 15, with the bevel angle of blade (1) producing better results than the designs of blades (2), (3), (4) and (5). Blade 5 has the narrowest bevel angle and would not produce a product that is free of "switch back" of angles of inclination of the lands of a sheet of expanded slit paper.

Figure 16:
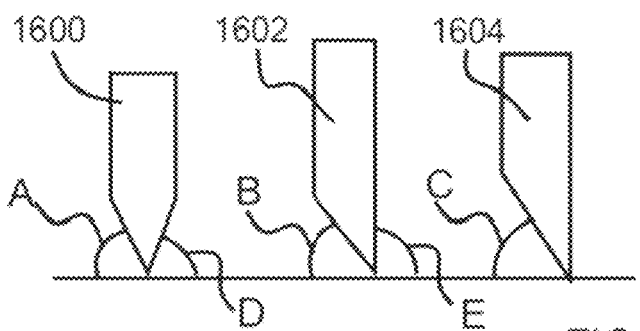
FIG. 16 is a schematic illustrates of slitting blades having varying cutting angles.
Figure 17:
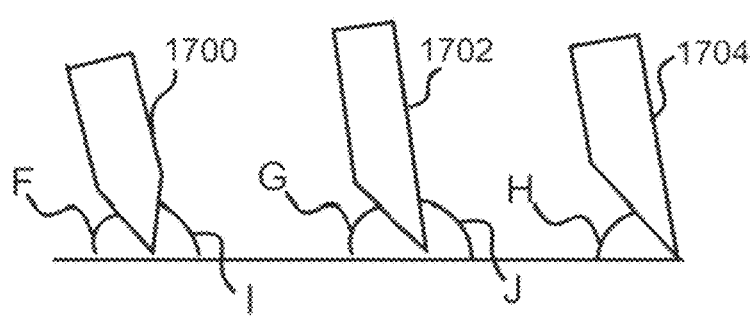
FIG. 17 is a schematic illustrates of offset slitting blades having varying cutting angles.

The blade design 1600 of FIG. 16 has the same angles A and D for both bevels, and would not produce a product that is free of "switch back" of angles of inclination of the lands of a sheet of expanded slit paper. The blade design 1602 has a roughly 45° bevel angle (B) and applies a wedging action against one side of the slit and a straight cut against the other edge of a slit due to the 90° angle (E). The wedging action of the bevel having an angle (B) forces the surface of the paper downward along the surface of the paper at the edge of the slit while the non-beveled side of the blade have an angle (E) of about 90° applies no wedging action. The blade design 1604 has a wider bevel angle (C) than the blade 1600, but similar to blade 1602, applies a wedging action against one side of the slit and a straight cut against the other edge of a slit.

Life of slitting tool blades is based on the number of revolutions of a tool produces switch backs that are less than 20% of length of a sheet of slit paper on a roll or in flat section. At the end of the life of the slitting tool, the blades are sharpened or replaced. When the combined lengths of switch back regions exceed about 20% of the length of the roll, the blades must be replaced or re-sharpened. Optionally, the replacement or re-sharpening of the blades can be set for the combined lengths of switch back regions exceed about 10% of the length of the roll. Interlocking occurs in regions where two adjacent expanded sheets are free of switch back or where both sheets have undergone switch back in the same region. Preferably, at least 80% of two adjacent sheets is interlocked and most preferably, at least 90% of two adjacent sheets is interlocked. Looking at interlocking from another perspective, preferably no more than 20% of adjacent sheets nest due to switch back and most preferably, no more than 10% of adjacent sheets nest due to switch back. Phrased another way, the minimum desired interlocking occurs when up to 20% of adjacent sheets have undergone switch back. In regions where both sheets have undergone switch back, interlocking will occur and thus such regions are excluded from the calculation of the amount of switch back that has occurred.

In an alternate blade design suitable for use with soft anvils, the blades 1700, 1702, and 1704 are offset as compared to the blades of FIG. 16. The design of blade 1700 has a bevel angle (F) that can produced a wedging effect, but bevel angle (I) also can produce a slight wedging effect thus negating the beneficial effect of the bevel angle (F). The blade design of blade 1702 produces a substantial wedging action due to the bevel angle (G) and no counteracting wedging from the straight side of the blade represented by angle (J). The blade design of blade 1704 produces a substantial wedging action due to the bevel angle (H) and no counteracting wedging from the straight side of the blade which forms and angle greater than goo with the paper that is being slit.

Figure 18:
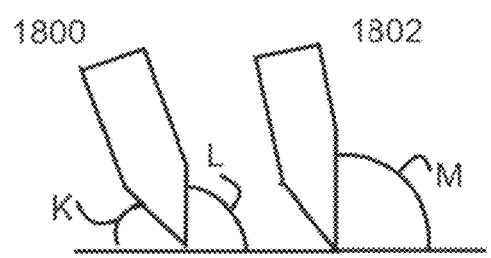
FIG. 18 is a schematic illustrates of offset slitting blades having varying cutting angles.

Blade 1800 of FIG. 18, is an illustration of a blade have an excessive bevel angle (K) in combination with a substantially 90° angle (L). By way of contrast blade 1802 has different bevels for the V shaped cutting edge of blade 1802 such that a wedging effect is produce by one side of the V shaped cutting edge and no wedging effect is produced by the other side of the V shaped cutting edge because of the bevel angle of about 90° produces no wedging effect.

To produce expansion of the slit paper and form lands with an angle of inclination that is consistent along the entire length of the expanded sheet, one side of the cutting edge of the blade is at an angle of substantially less than 90° with respect to the plane of the paper and the other side of the cutting edge of the blade is at an angle of at least 900 with respect to the plane of the paper, and preferably at an angle of 90°.

The wedging action of the slit forming blade forces one edge of a slit to be below the plane of the slit sheet, at least at the opposing ends of the slit, thus biasing the cells toward a consistent opening angle 90° during the expansion step.

The preferred range for the bevel angle is in the range from 1° to 3°, when measuring the angle between the two sides of the cutting region of a blade. With respect to the angles (B) and (C), the range is between 97 and 89 degrees for the beveled surface and 90 degrees for the unbeveled surface.

Because virgin paper is thinner than recycled paper, recycled paper responds more substantially to the wedging action of the slit cutting blades as described above, thus optimizing the ability of the recycled paper to form a uniform, consistent angle of inclination of the lands along the entire length of an expanded slit sheet.

Virgin paper can be thinner than recycled paper and provide equivalent strength based on the longer cellulose fibers. The thinner paper will be less affected than a recycled thicker paper equivalent and thus would need a shallower bevel angled knife. Looking to FIG. 16, the angles (B) and (C) would have to be shallower for Virgin paper than for recycled paper. From another perspective, the included angle of the bevel should be greater for Virgin paper than for recycled paper, Thus, for Virgin paper, the included angle of the beveled blade can be up to 6° for Virgin paper.

Estimated economic comparison of non-switch back product and tissue layered product.

Twice the Speed

The expander of the present invention simultaneously feeds two layers of expanded paper as compared to a separator sheet design feeding one layer of expanded sheet material and one separator sheet layer. Consequently, the wrapping operation using the system of the present invention is twice as fast as that of the separator sheet system of the prior art.

By virtue of doubling of the speed of packaging, labor costs are reduced by about 50%.

Use of Less Product

The product of the present invention requires less material to wrap an object because of the resistance to retraction and flattening of the cells, and the improved performance under compression.

Eliminates a Component

The process of the present invention is less complex and easier to use because it eliminates the need to use a separator sheet. The elimination of the separator sheet reduces the cost of the product, generally by about 30%.

Maintains Better Stretch Due to the Interlocking

As described above, the interlocking of adjacent sheets of expanded slit sheet material resists retraction of the expansion of the sheets.

Expanded Slit Sheet Material Products

There are multiple end uses of the expanded slit sheet material. The first is as a wrapping product. The stretching process traps the goods firmly due to the inherent desire for the slit sheet material to return to its flat/undexpanded position. This paper fiber memory assures a tight fit. The method of wrapping of the interlocking cells maintains the locked position that maintains the strain on the fibers fighting to return to its original position.

A second use is as a void fill product. Since the material will not be wrapped and merely laid into the box to fill empty space, the inherent fiber memory creates an adverse effect by decreasing the angle of the hexagonal cell thus reducing the overall void fill volume. To overcome this it is necessary to super-stretch the slit sheet material so that the fibers are slightly torn thereby eliminating or minimizing the fiber memory.

The slit sheet expander paper tension or gearing can be adjusted for either approximately 10 to 20 percent less than full stretch for the wrapping method so that the packer performs the final stretch. In the first case as a wrap, it would be best if the cells are not fully stretched so that the final stretch, performed by the packer, makes a more secure fit.

| Non-switch back (NSB) tool resharpening versus Tissue-Layered (TL) System | | | |
|---|---|---|---|
| Tooling is $1500.00 to resharpen | Non-Switch Back(NSB) | | Slit sheet with tissue separator |
| Tooling can be resharpened 6 times. | 1,800,000 | 5,700,000 | Per resharpening |
| Tool cost $11,000 | 7 | 7 | uses with 6 sharpenings |
| 40,000,000 total revolution life | 12,600,000 | 39,900,000 | Total life revolutions |
| 14" repeat tool = 1.17' | | | |
| Tissue $1300/ton | $ 11,000.00 | $ 11,000.00 | Cost per tool |
| 384,000 sq feet/ton | $ 12,600.00 | $ 12,600.00 | Cost for 6 sharpenings with freight |
| .003385 per square foot | $ 23,600.00 | $ 23,600.00 | Total Cost for tool |
| | 14,742,000 | 46,683,000 | Total number of feet per tool life |
| | $ 23,600.00 | $ 5,900.00 | Comparison of tool lives |
| | 0 | 0.003385 | Tissue Cost per foot |
| | 0 | $ 42,651.00 | Total tissue cost at NSB tool life |
| | $ 23,600.00 | $ 48,551.00 | Total cost for tool and tissue |
| | $ 24,951.00 | 0 | Savings |
| | Other savings not included | | |
| | Shipping costs to customer | | |
| | Pack site loading labor | | |

Expansion would be to maximum of 90% of maximum stretch. This retraction helps the wrapping method by enhancing the interlocking effect, but diminishes the value of the void fill method. By way of contrast, in the case of a void fill product, the desired end result is achieved when the cells are super stretched to remove the desire for the cells to retract back to the flat. As a void fill the super stretch would be approximately 101 to 110 percent depending upon the paper used. As a void fill method requires the product to remain at its maximum loft without the help of the packer.

The relative take-up speed and resistance speed of the feed roller(s) are adjusted to determine the degree of expansion that is being produced by the expansion equipment. The expansion device can be of the type disclosed in U.S. Pat. No. 5,782,735.

While the invention has been described in terms of several preferred embodiments, it should be understood that there are many alterations, permutations and equivalents that fall within the scope of this invention. It should also be noted that there are alternative ways of implementing both the process and apparatus of the present invention. For example, steps do not necessarily need to occur in the orders shown in the accompanying figures, and may be rearranged as appropriate. It is therefore intended that the appended claim includes all such alterations, permutations, and equivalents as fall within the true spirit and scope of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about", "substantially", or "approximately," Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 10%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

The invention claimed is:

1. A paper packaging product comprising:
at least a pair of limited nesting adjacent layers of an expanded slit paper packaging product having a plurality of slits in a pattern,
said slits' pattern upon expansion of a length of said pair of limited nesting adjacent layers forming cells having lead wall regions including inclination angles,
wherein said at least a pair of limited nesting adjacent layers includes a first layer having a slit pattern with a row of land portions and a second layer having a row of land portions, wherein said slit pattern of said first layer includes a different spacing between rows of slits than said slit pattern of said second layer and the row of land portions of the first layer is offset from the row of land portions of the second layer, wherein said rows of slits extend in width directions of said first and second layers, respectively, and said spacings between rows of slits are measured in unexpanded states of said first and second layers, respectively, and said first layer and said second layer interlocking one another.

2. The paper packaging product of claim 1, further comprising said paper product wrapped around an object thereby cushioning said wrapped object.

3. The paper packaging product of claim 2, wherein the land portions of said first layer of expanded slit paper are oriented non-parallel to the land portions of said second layer of expanded slit paper, whereby reducing nesting between said first layer of expanded slit paper and said second layer of expanded slit paper.

4. The paper packaging product of claim 3, wherein the land portions of said first layer and said second layer are reversely oriented from each other.

5. The paper packaging product of claim 1, further comprising said slits having a wedge effect on one edge of each slit that is sufficient to cause upon expansion, the lead wall regions to consistently have an inclination angle in the range from about 50 to 85 degrees along the length of the expanded slit paper.

6. The paper packaging product of claim 1, further comprising said paper wrapping product wrapped around an object and cushioning said wrapped object, said interlocking of adjacent expanded paper layers maintaining said paper wrapping product under tension around said wrapped product.

7. The paper packaging product of claim 1, further comprising said interlocking of adjacent expanded paper layers maintains a strain on the fibers of the paper packaging product as the fibers strain to return to their unexpanded orientation.

8. The paper packaging product of claim 1, wherein said lead wall regions include inclination angles in a range from 50 to 85 degrees.

9. The paper packaging product of claim 1, wherein the land portions of said first layer of expanded slit paper are oriented non-parallel to the land portions of said second layer of expanded slit paper, whereby reducing nesting between said first layer of expanded slit paper and said second layer of expanded slit paper.

10. The paper packaging product of claim 9, wherein the land portions of said first layer and said second layer are reversely oriented from each other.

* * * * *